United States Patent
Zoerner et al.

[11] Patent Number: 6,042,197
[45] Date of Patent: Mar. 28, 2000

[54] AIR-DRYING SYSTEM, IN PARTICULAR FOR RAIL VEHICLES

[75] Inventors: Wilfried Zoerner, Weichs; Viktor Fiebiger, Munich, both of Germany

[73] Assignee: Knorr-Bremse Systeme Fuer Schienenfahrzeuge GmbH, Munich, Germany

[21] Appl. No.: 08/981,996
[22] PCT Filed: Mar. 11, 1997
[86] PCT No.: PCT/DE97/00487
§ 371 Date: May 11, 1998
§ 102(e) Date: May 11, 1998
[87] PCT Pub. No.: WO97/42068
PCT Pub. Date: Nov. 13, 1997

[30] Foreign Application Priority Data

May 3, 1996 [DE] Germany .......................... 196 17 829

[51] Int. Cl.[7] .................................................. B60T 17/04
[52] U.S. Cl. .......................................... 303/28; 303/54.2
[58] Field of Search ................. 34/80–82; 96/130–137, 96/139–141; 303/28, 84.2

[56] References Cited

U.S. PATENT DOCUMENTS

| | | | |
|---|---|---|---|
| 5,662,727 | 9/1997 | Castle et al. | 96/130 |
| 5,901,459 | 5/1999 | Tipp et al. | 34/81 |
| 5,901,464 | 5/1999 | Kazakis | 34/562 |

FOREIGN PATENT DOCUMENTS

| | | |
|---|---|---|
| 3525083 | 1/1987 | Germany . |
| 3533893 | 3/1987 | Germany . |

*Primary Examiner*—Chris Schwartz
*Attorney, Agent, or Firm*—W. F. Fasse; W. G. Fasse

[57] ABSTRACT

An air-drying system, in particular for the pneumatic braking systems of rail vehicles, including at least two air-drying chambers (1L, 1R) interconnected with one another via first and second regeneration lines (2 and 2'). In a reversibly switchable manner one of the chambers is used for air drying and the respective other chamber is used for regeneration of the air-drying agent (adsorbate) contained in the chambers. The second regeneration line (2') can be switched on and off as necessary to provide two different flow rates of regeneration air.

16 Claims, 2 Drawing Sheets

AIR-DRYING SYSTEM, IN PARTICULAR FOR RAIL VEHICLES

FIELD OF THE INVENTION

The invention relates to an air-drying system, in particular for pneumatic brake systems of rail vehicles, which comprises at least two air-drying chambers interconnected with one another via a regeneration line, whereby normally, in a reversibly switchable manner, one of the chambers is used for air drying and the respective other chamber is used for regeneration of the air-drying agent contained in the chambers.

BACKGROUND INFORMATION

Such air-drying systems are known in the state of the art, and are, for example, distributed by the company Knorr-Bremse. FIG. 2 shows such a prior art-drying system. According to FIG. 2, a cold generating adsorption dryer in a two-chambered embodiment is operated in a two-phase manner, i.e. one drying phase and one regeneration phase are carried out in parallel or simultaneously with one another. While the main airstream is dried in one chamber, for example the right chamber 1R, chamber ) the drying agent in the other chamber 1L is regenerated. As the air flows through the drying agent or adsorbate 37R in the right chamber 1R, the water contained in the air is extracted therefrom to such an extent that the relative humidity of the main airstream upon exiting the right chamber is less than or equal to 35%.

A portion of the dried air is branched off from the main air-stream, expanded through a regeneration line 41 with a regeneration nozzle or orifice 47, arranged therein and blown through the saturated drying agent 37L of the second chamber 1L before being finally exhausted into the atmosphere. The moisture that has been adsorbed into the drying agent 37L in the left chamber 1L during the prior drying phase is now extracted from the drying agent 37L by the extremely dry air passing therethrough. From time to time the functional operating cycle is switched between the two chambers as needed.

In pneumatic systems of rail vehicles, two compressors are often used for long trains and high air consumption in order to reduce the system filling time. In such a case when two compressors are employed for filling, one of the compressors is switched off upon reaching a predetermined system pressure. The normal functional operation is then taken over and carried out by one compressor alone. For cost reasons, the air-stream of both compressors is directed through a single air dryer. In order to prevent an over-saturation of the air-drying system, the regeneration orifice is therefore designed and dimensioned for providing a proper regeneration airflow for the operation of two compressors. In other words basically the regeneration orifice is over-dimensioned for normal operation with one compressor. This results in an excessive air and energy consumption during normal operation.

SUMMARY OF THE INVENTION

In view of the above, the invention aims to overcome or avoid the disadvantages of the prior art, and to achieve additional advantages, as apparent from the present description.

The above objects have been achieved in an air drying system and method according to the invention, including first and second air drying chambers respectively containing an air drying adsorbate, a first regeneration air line interconnecting the first and second air drying chambers for allowing a first air flow therebetween, and a second regeneration air line including a valve mechanism interconnecting the first and second air drying chambers, wherein the valve mechanism can be switched on and off for selectively allowing a second air flow between the first and second chambers through the second regeneration air line.

In comparison to the above mentioned state of the art, according to the invention at least one further regeneration line, which may be switched on and off as necessary, is connected between the two chambers. The two regeneration lines which preferably provided with respective regeneration orifices, preferably together comprise a cross-sectional area that corresponds to the cross-sectional area of the single typical orifice that is used in the conventional system. By providing the further or additional regeneration line, the regeneration can be carried out with the proper regeneration airflow rate as needed, depending on the operating requirements, in contrast to the state of the art. During the operation of only one compressor, the connection via the additional regeneration orifice is interrupted, so that the air consumption is reduced in normal operation. This in turn leads to a considerable energy savings.

In an especially preferred example embodiment of the invention, a pneumatically actuated piston is connected in series with the additional regeneration orifice, whereby the piston is preferably subjected to and actuated by pressure from the brake reservoir container. Thereby, a truly need-dependent switching of the additional regeneration orifice is achieved in a simple manner without significant constructive effort. Namely, if the reservoir container pressure exceeds a certain threshold value, then the piston is actuated to block the additional regeneration line and thereby switch off the second regeneration orifice. The switch-over pressure of the piston may be preset in a simple manner by means of an adjustment screw.

In the following, the invention will be described in detail in connection with example embodiments with reference to the drawings, wherein.

DETAILED DESCRIPTION OF PREFERRED EXAMPLE EMBODIMENTS AND OF THE BEST MODE OF THE INVENTION

Figure 2:
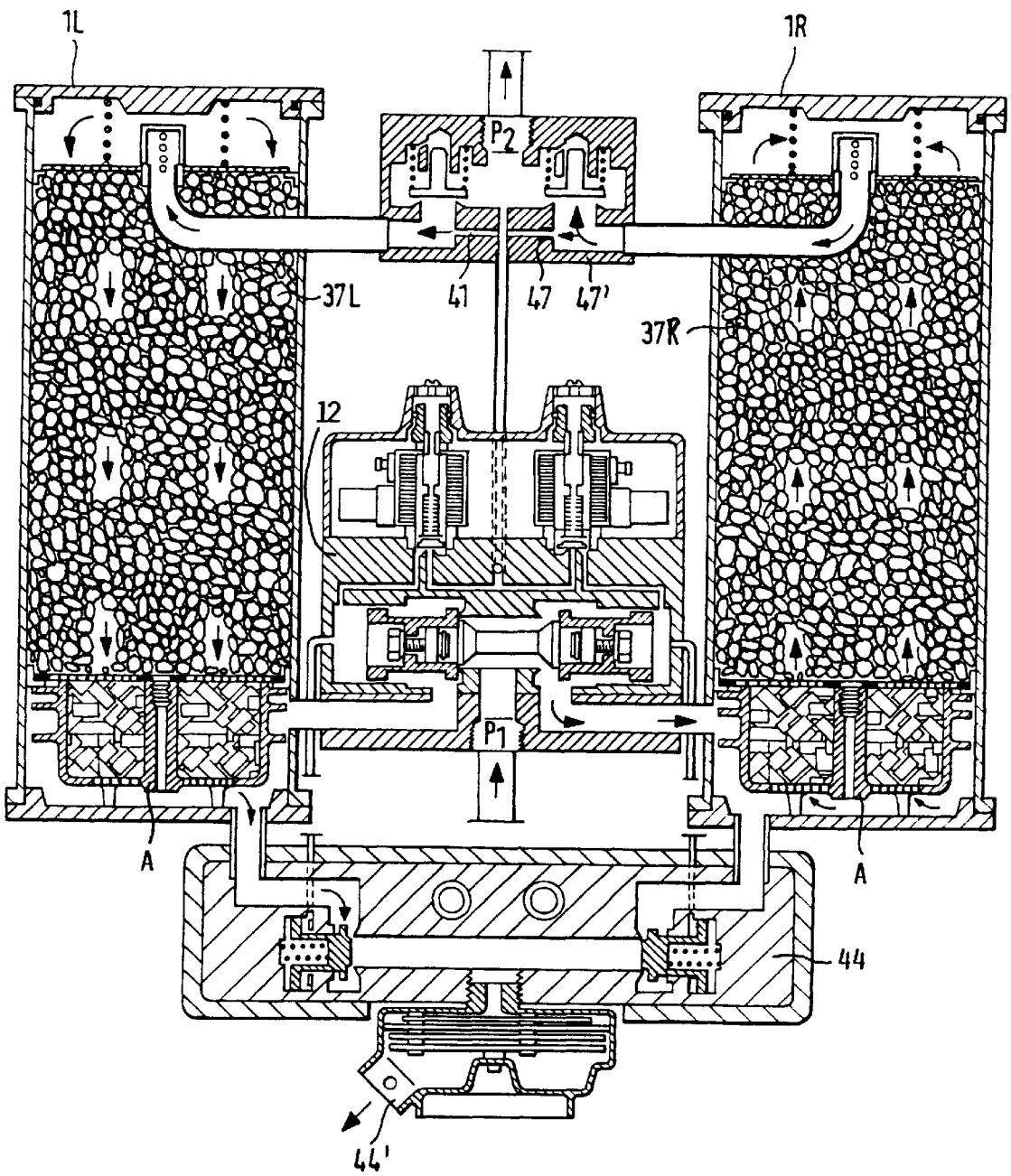
FIG. 2 shows a schematic sectional view of a two-chambered air-drying system according to the prior art.

FIG. 2 shows an air-drying system according to the prior art, in an operating position in which a first or right chamber 1R is in a drying phase and the second or left chamber 1L is in the regeneration phase. With regard to the basic function and operation of this air-drying system, reference is made to the device description "B-MA 20.27" published by the company Knorr-Bremse Systeme für Schienenfahrzeuge GmbH, Munich, Germany. The essential elements in air flow direction sequence include a pressurized air connection P1 of the compressors, a switching value unit 12, a structural group representing the oil separator A, the right chamber 1R with adsorbate 37R, the regeneration unit 47', the left chamber 1L with adsorbate 37L, the other side of the switching valve unit 12 and a de-watering valve 44 with an exhaust outlet 44'. The functional operation of the prior art system is described above under "Background Information".

Figure 1:
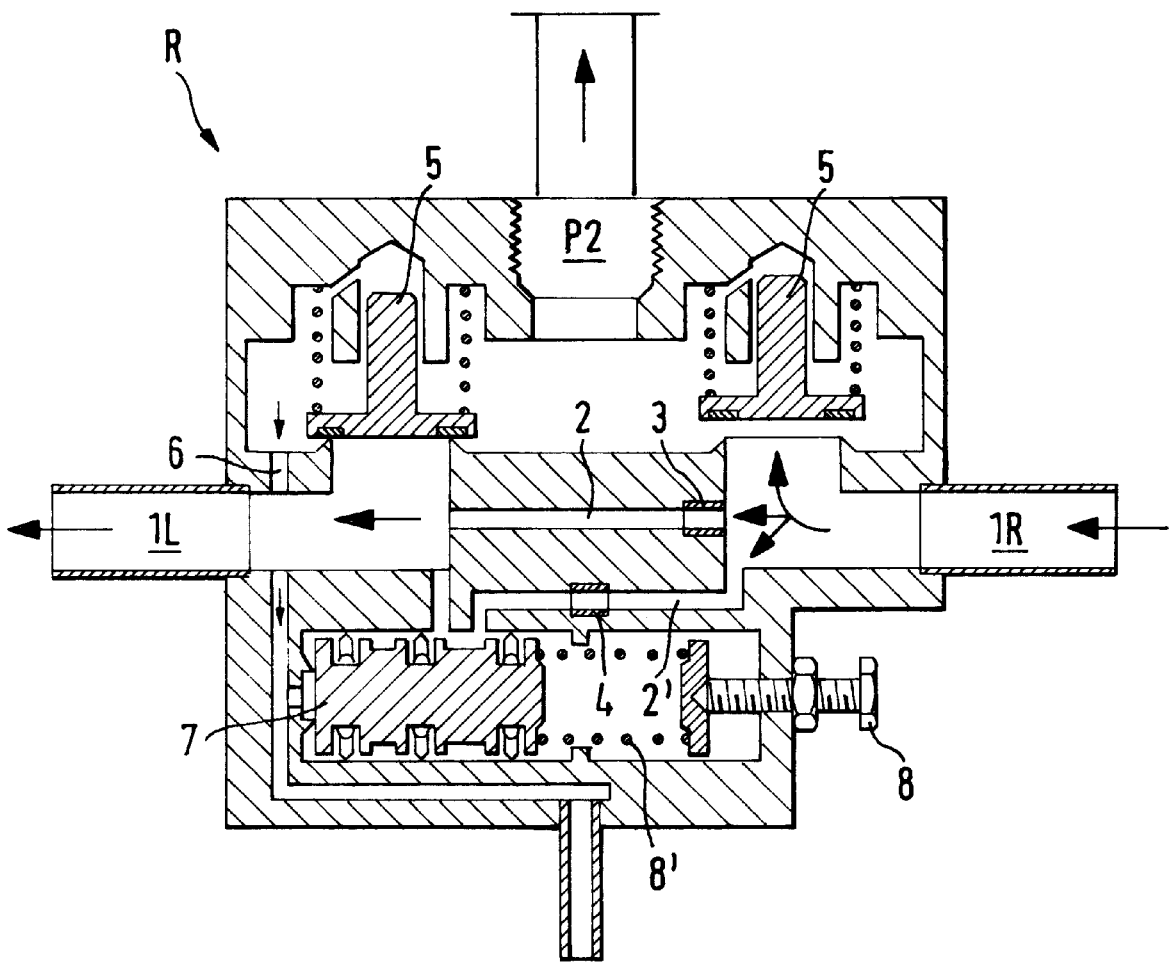
FIG. 1 shows a schematic sectional view of components in a regeneration circuit that are significant to the invention, in an air-drying system according to the invention.

In comparison to the above prior art, the invention distinguishes itself by the embodiment configuration of the regeneration unit R shown in FIG. 1. According to the invention, the regeneration unit R comprises a second regeneration line 2' with a regeneration orifice 4 therein in addition to a first regeneration line 2 with a regeneration orifice 3. During the filling of a train's pneumatic braking system, in the operating position shown in FIG. 1, regeneration air flows through both of the regeneration orifices 3 and 4 from the adsorbent container or chamber 1R to the adsorbent container 1L. The main portion of the dry air exiting from the container 1R is directed through a valve 5 into a braking system of the train (not shown) at an operating pressure through a pressure port P2. The regeneration unit further includes a piston 7 which is acted upon by the above mentioned operating pressure through a channel 6. The piston 7 is embodied in such a manner that it blocks the air path through the second regeneration line 2' in one of its switching positions and opens the air path through the second regeneration line 2' in its other switching position.

Upon reaching a predetermined system operating pressure, which may be adjusted as desired with an adjustment screw 8, and biasing spring 8' the piston 7 switches over from its open position to its closed position and blocks the path through the second regeneration line 2' and its orifice 4. Thus, for the further operation (generally with only one compressor) the regeneration is only carried out via the regeneration orifice 3, in the first regeneration line 2 which reduces the air and energy consumption. In other words, when the air pressure at the pressure port P2 is below a preselected threshold pressure, then dry regeneration air will be provided through both regeneration lines 2 and 2' to the chamber 1L undergoing regeneration. However, once the air pressure at the port P2 exceeds the preselected threshold, then further regeneration air will be supplied only through the first regeneration line 2.

The on and off switching of the second regeneration orifice 4 is therefore independent of the switching position of the compressors; instead it is determined or actuated exclusively according to the system pressure at P2. If this pressure is high enough, however, in the ordinary case the second compressor would also be switched off, so that a reduced regeneration is sufficient. The piston 7 is embodied in such a manner that it opens or closes the regeneration line 2' by means of side control surfaces of the piston 7 as it switches over.

What is claimed is:

1. An air drying system comprising
    first and second air drying chambers respectively containing an air drying adsorbate,
    a first regeneration air line interconnecting said first and second air drying chambers for allowing a first air flow therebetween, and
    a second regeneration air line including a valve mechanism interconnecting said first and second air drying chambers, wherein said valve mechanism can be switched on and off for selectively allowing a second air flow between said first and second chambers through said second regeneration air line.

2. The air drying system according to claim 1, wherein said valve mechanism comprises a pneumatically actuatable piston interposed in an air flow path of said second regeneration air line, wherein said piston is switchable between a first piston position in which said piston opens said air flow path to allow said second air flow through said second regeneration air line and a second piston position in which said piston blocks said air flow path to prevent said second air flow from flowing through said second regeneration air line.

3. The air drying system according to claim 2, further comprising a pressurized air channel connected to said piston and connected selectably to one of said first and second air drying chambers to provide dried pressurized air to said piston for pneumatically actuating said piston to switch between said first and second piston positions.

4. The air drying system according to claim 3, further comprising an adjustment screw arranged to cooperate with and bias said piston to selectably adjust a switching threshold pressure of said pressurized air necessary for actuating said piston to switch between said first and second piston positions.

5. The air drying system according to claim 2, further comprising an adjustment screw arranged to cooperate with and bias said piston to selectably adjust a switching threshold pressure necessary for actuating said piston to switch between said first and second piston positions.

6. The air drying system according to claim 2, wherein said piston includes flow passage control surfaces on at least one side thereof, and wherein said flow passage control surfaces are adapted to respectively and selectively open and block said air flow path.

7. The air drying system according to claim 1, further comprising a regeneration unit including said first and second regeneration air lines integrated therein and further including first and second air ports respectively connected to said first and second air drying chambers, an air manifold, first and second valves respectively interposed between said first and second air ports and said air manifold, and an air outlet port connected to said air manifold and adapted to provide pressurized air out of said regeneration unit, wherein said first and second regeneration lines are each respectively connected in parallel with each other between said first and second air ports.

8. The air drying system according to claim 7, wherein said valve mechanism comprises a piston arranged in a cylinder cavity within said regeneration unit, and a pressurized air channel connecting said air manifold with said cylinder cavity on a first end of said piston, wherein said piston is arranged to be switchable between a first piston position in which said piston does not block said second regeneration air line and a second piston position in which said piston blocks said second regeneration air line responsively to a pressure level of air provided through said pressurized air channel.

9. The air drying system according to claim 8, wherein said regeneration unit further comprises an adjustment screw protruding into said cylinder cavity, and a biasing spring arranged in said cylinder cavity between said adjustment screw and a second end of said piston opposite said first end.

10. The air drying system according to claim 8, wherein said piston includes an outer surface having control surfaces thereon, and wherein said control surfaces are selectively interposed in a path of said second regeneration air line responsively to switching of said piston between said first and second piston positions.

11. The air drying system according to claim 1, further comprising a first regeneration orifice arranged in said first regeneration air line and a second regeneration orifice arranged in said second regeneration air line.

12. The air drying system according to claim 11, wherein said valve mechanism comprises a pneumatically actuatable piston interposed in an air flow path of said second regeneration air line, wherein said piston is switchable between a first piston position in which said piston opens said air flow path to allow said second air flow through said second regeneration air line and a second piston position in which said piston blocks said air flow path to prevent said second air flow from flowing through said second regeneration air line.

13. The air drying system according to claim 1, further in combination with a rail vehicle including a pneumatic braking system, wherein said air drying system is connected to said pneumatic braking system to provide air thereto.

14. The air drying system according to claim 1, further comprising a switching valve arrangement including an air inlet port selectively and switchably connected to said first and second chambers for providing air that is to be dried into a selected one of said first and second chambers, whereby said selected one of said chambers is used for drying said air while the respective other one of said chambers is undergoing regeneration of said adsorbate contained therein.

15. A method of operating an air drying system including first and second air drying chambers containing an air drying adsorbate, and first and second regeneration air lines connected in parallel with one another between said first and second chambers, said method comprising the following steps:

a) flowing air into and through said first chamber;

b) flowing air from said first chamber to said second chamber through both of said first and second regeneration air lines while a system air pressure in said system is below a threshold pressure;

c) continuing said flowing of air in said steps a) and b) while increasing said system air pressure;

d) blocking the flow of air through said second regeneration air line and continuing to flow air through said first regeneration air line from said first chamber to said second chamber once said system air pressure reaches said threshold pressure and while said system air pressure exceeds said threshold pressure; and e) exhausting air from said second chamber to the environment.

16. The method according to claim 15, further comprising a subsequent cycle of reversing a direction of all of said flows of air, comprising flowing air into said second chamber and from said second chamber to said first chamber, and exhausting air from said first chamber to the atmosphere.

* * * * *

UNITED STATES PATENT AND TRADEMARK OFFICE
CERTIFICATE OF CORRECTION

PATENT NO. : 6,042,197
DATED : Mar. 28, 2000
INVENTOR(S) : Zoerner et al.

It is certified that error appears in the above-identified patent and that said Letters Patent is hereby corrected as shown below:

Col. 1, line 24, after "1R,", delete "chamber )";
       line 49, after "the", replace "air-stream" by --airstream--;
Col. 2, line 13, after "lines", insert --,--, after "which", insert --are--;
following line 37, and above line 38, insert the following heading:
    --BRIEF DESCRIPTION OF THE DRAWINGS--;
       line 58, after "P1", insert --providing compressed air from--;
       line 59, before "the", delete "of", after "switching", replace "value" by --valve--;
Col. 3, line 9, before "1L", insert --or chamber--;

Signed and Sealed this

Twentieth Day of February, 2001

Attest:

NICHOLAS P. GODICI

*Attesting Officer*      *Acting Director of the United States Patent and Trademark Office*